United States Patent
Brauer et al.

(10) Patent No.: US 10,186,028 B2
(45) Date of Patent: Jan. 22, 2019

(54) DEFECT SIGNAL TO NOISE ENHANCEMENT BY REDUCING DIE TO DIE PROCESS NOISE

(71) Applicant: KLA-Tencor Corporation, Milpitas, CA (US)

(72) Inventors: Bjorn Brauer, Beaverton, OR (US); James A. Smith, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 93 days.

(21) Appl. No.: 15/352,664

(22) Filed: Nov. 16, 2016

(65) Prior Publication Data
US 2017/0169552 A1    Jun. 15, 2017

Related U.S. Application Data

(60) Provisional application No. 62/265,019, filed on Dec. 9, 2015.

(51) Int. Cl.
   *G06K 9/00*    (2006.01)
   *G06T 7/00*    (2017.01)

(52) U.S. Cl.
   CPC .... *G06T 7/001* (2013.01); *G06T 2207/10061* (2013.01); *G06T 2207/30148* (2013.01)

(58) Field of Classification Search
   CPC . G06T 2207/10061; G06T 2207/30148; G06T 2207/30108; G06T 7/001; G06T 7/0002; G06T 7/0004; G06T 5/40
   See application file for complete search history.

(56) References Cited

U.S. PATENT DOCUMENTS

| | | | |
|---|---|---|---|
| 6,657,221 B2 | 12/2003 | Nakagaki et al. | |
| 6,797,975 B2 | 9/2004 | Nishiyama et al. | |
| 7,508,973 B2 | 3/2009 | Okabe et al. | |
| 7,774,153 B1* | 8/2010 | Smith | G06T 5/002 |
| | | | 702/85 |
| 2003/0050761 A1 | 3/2003 | Okabe et al. | |
| 2003/0058435 A1* | 3/2003 | Honda | G01N 21/9501 |
| | | | 356/237.1 |
| 2007/0105245 A1 | 5/2007 | Funakoshi et al. | |
| 2015/0221076 A1* | 8/2015 | Gao | G06T 7/001 |
| | | | 382/149 |

OTHER PUBLICATIONS

ISA/KR, International Search Report for PCT/US2016/065666 dated Mar. 30, 2017.

(Continued)

*Primary Examiner* — Eueng-Nan Yeh
(74) *Attorney, Agent, or Firm* — Hodgson Russ LLP

(57) ABSTRACT

Gray level histograms for a test image and a reference image are adjusted by histogram scaling. Parameters from the histogram scaling are applied to the test image and the reference image. After the parameters are applied, the reference image and the test image are compared to produce a difference image, such as by subtracting the reference image from the test image. Noise in the difference image can be reduced, which improves defect identification in the difference image. In addition, noisy structures in the difference image which are elongated in vertical or horizontal direction can be found. If the noise exceeds a certain threshold, the structures may not be inspected.

15 Claims, 6 Drawing Sheets

(56) References Cited

OTHER PUBLICATIONS

ISA/KR, Written Opinion of the International Searching Authority for PCT/US2016/065666 dated Mar. 30, 2017.
The Mathworks, Inc., Contrast Adjustment, MATLAB & Simulink, https://www.mathworks.com/help/images/contrast-adjustment.html Oct. 10, 2014.

* cited by examiner

DEFECT SIGNAL TO NOISE ENHANCEMENT BY REDUCING DIE TO DIE PROCESS NOISE

CROSS-REFERENCE TO RELATED APPLICATIONS

This application claims priority to the provisional patent application filed Dec. 9, 2015 and assigned U.S. App. No. 62/265,019, the disclosure of which is hereby incorporated by reference.

FIELD OF THE DISCLOSURE

This disclosure relates to image processing.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Defects can be detected by comparing an image of a wafer to a reference image. However, different layers in a semiconductor wafer have different thicknesses. Even the same layer of a semiconductor wafer can have different thicknesses. Thickness variation can affect the gray level of an image because layer thickness affects reflectivity. Die-to-die material thickness variation can result in a different reflectivity between two of the dies, which leads to a different background gray level value for the images of the dies. This can be referred to as process variation.

Color variation or noise is an example of process variation. It is difficult to correct color variation or noise. This can make it impossible to identify the best mode for defect inspection because the defect cannot be seen in the color noise.

Process variation can make it difficult to find defects and may result in false positives. Increasing tolerance in a histogram can result in loss of some of the defects. Therefore, what is needed is an improved image processing technique.

BRIEF SUMMARY OF THE DISCLOSURE

In a first embodiment, a system is provided. The system comprises a stage configured to hold a wafer; an image generation system configured to generate a test image; an electronic data storage unit in which at least one reference image is stored; and a controller in electronic communication with the image generation system and the electronic data storage unit. The test image is an image of a portion of the wafer. The controller is configured to: receive the test image from the image generation system and the reference image from the electronic data storage unit; calculate a gray level histogram for the test image; calculate a gray level histogram for the reference image; adjust the gray level histograms of the test image and the reference image by histogram scaling whereby parameters related to the histogram scaling are generated; apply the parameters to the test image and the reference image; and compare the reference image and the test image to produce a difference image after the parameters are applied to the test image and the reference image.

The controller can include a processor and a communication port in electronic communication with the processor and the electronic data storage unit.

The image generation system can be configured to use at least one of an electron beam, a broad band plasma, or a laser to generate the test image. The image generation system can be part of a scanning electron microscope. The image generation system can be configured to use one of bright field or dark field illumination.

The histogram scaling can be configured to subtract a mean, multiply by a gain factor, and add a constant intensity offset.

The difference image can be generated by subtracting the reference image from the test image.

The controller can be further configured to identify a defect on the difference image.

The test image and the reference image may correspond to a same region of the wafer.

The controller can be further configured to: calculate projections for the difference image perpendicular to an x axis for a first length; calculate projections for the difference image perpendicular to a y axis for a second length; and mask one or more pixels in the difference image that exceed an x projection threshold or a y projection threshold.

In a second embodiment, a method is provided. The method comprises: receiving a test image from a system; calculating, using a controller, a gray level histogram for the test image; calculating, using the controller, a gray level histogram for a reference image; adjusting, using the controller, the gray level histograms of the test image and the reference image by histogram scaling whereby parameters related to the histogram scaling are generated; applying, using the controller, the parameters to the test image and the reference image; and comparing, using the controller, the reference image and the test image to produce a difference image after the parameters are applied to the test image and the reference image. The test image is an image of a portion of a wafer. The test image may be, for example, a microscope image.

The histogram scaling can include subtracting a mean, multiplying by a gain factor, and adding a constant intensity offset.

The method can further comprise identifying, using the controller, a defect on the difference image.

The comparing can includes subtracting the reference image from the test image.

The test image and the reference image may correspond to a same region of the wafer.

The method can further comprise: calculating projections for the difference image perpendicular to an x axis for a first length; calculating projections for the difference image perpendicular to a y axis for a second length; and masking one or more pixels in the difference image that exceed an x projection threshold or a y projection threshold.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

It may be difficult to detect a particular defect of interest (DOI) because it is "buried" by process variation. Embodiments disclosed herein can reduce or eliminate process variation before a difference image is generated. The techniques disclosed herein can achieve color noise reduction by adjusting the background gray level of a reference image to an image of part of a wafer (e.g., a defect image or test image). This enhances sensitivity to the DOI. For example, the techniques disclosed herein provide improved defect inspection even when color is the dominating noise source, which can improve sensitivity to DOI. Finding these DOI can increase inspection efficiency and reliability.

Besides enhanced sensitivity to DOI, the techniques disclosed herein also can assist with optical mode selection because histogram scaling can reduce the difference of background noise between the test image and the reference image. If the background is more similar between the two images then the difference image will have less variation and, thus, the defect can be more easily detected because the perturbation is more pronounced in a quiet difference image.

Figure 1:
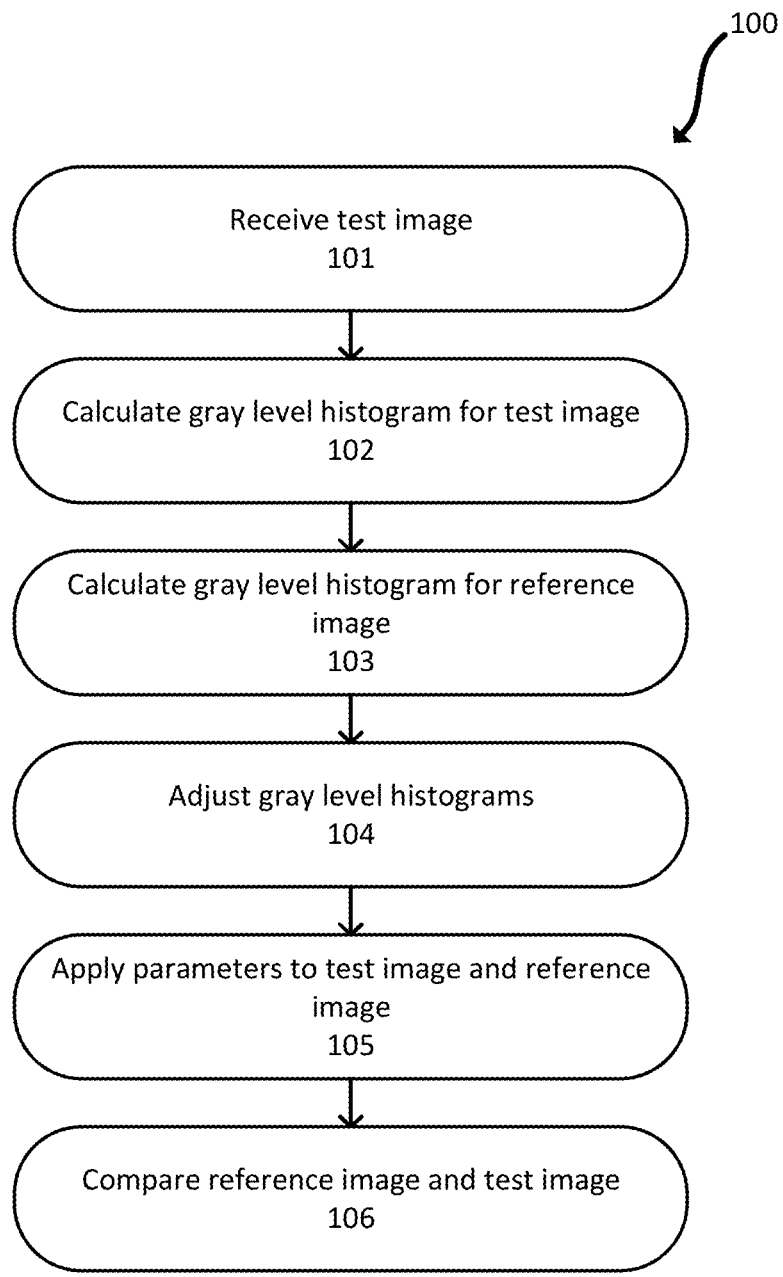
FIG. 1 is a flowchart of an embodiment of a method in accordance with the present disclosure.

FIG. 1 is a flowchart of an embodiment of a method 100. A test image is received 101, such as from a defect review system. The test image may be, for example, an image from an optical microscope or a scanning electron microscope image. A defect on the wafer is included in the test image, but not necessarily in a corresponding reference image. Both the test image and the reference image cover less than an entirety of the wafer. For example, the test image and the reference image may show a single die on a wafer. The test image and the reference image can correspond to one another. For example, the test image and the reference image may show the same die or same region of the wafer.

A gray level histogram is calculated 102 for the test image. A gray level histogram is calculated 103 for a reference image.

The gray level histograms of the test image and the reference image are adjusted 104 by histogram scaling. Parameters related to the histogram scaling are generated. For example, parameters like gain and offset are generated to adjust the gray scale of each image.

Figure 2:
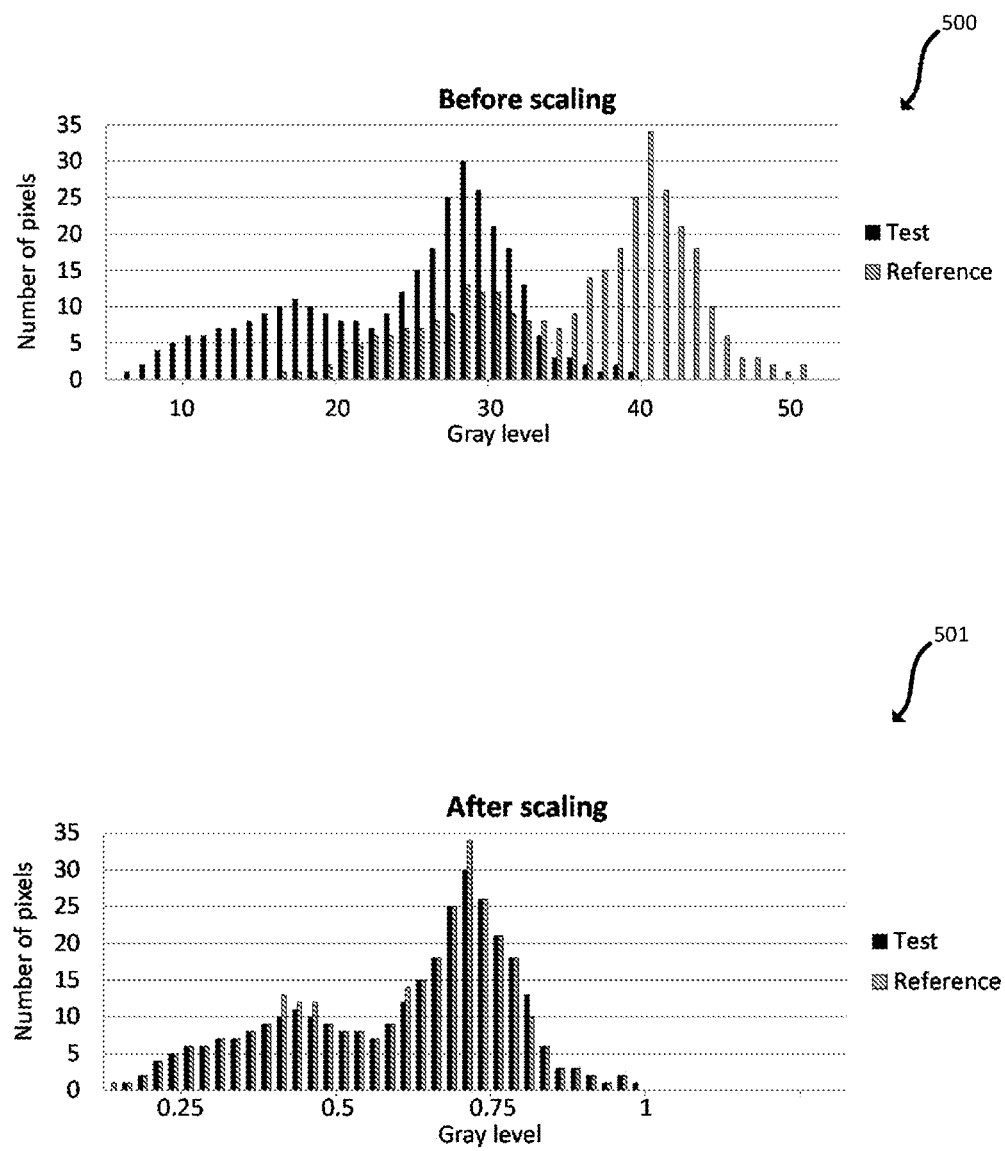
FIG. 2 shows examples of histogram scaling.

FIG. 2 shows examples of histogram scaling. The histogram 500 compares histograms of a test image (labelled "test") to a reference image (labelled "reference"). There are large differences in the histogram 500 between the test image and the reference image. The histogram 501 compares histograms of the test image and the reference image after histogram scaling. This leads to a smaller difference between the two images.

In an instance, histogram scaling involves stretching the histogram until it matches the shape of another histogram. This can include subtracting a mean (e.g., a cumulative distribution function (CDF)), multiplying by a gain factor, and then adding a constant intensity offset. The correction values can be pre-computed to equalize the intensities of two image histograms. For example, to apply a scaling correction to a given reference image, MaxTest, MaxRef, MeanTest, MeanRef, MinTest, and MinRef represent the maximum gray level intensity, mean (average) gray level intensity, and minimum gray level intensity values computed from a given test ("Test") and reference ("Ref") image pair. The original reference image intensity values (IntensityRef) can be transformed to new values (IntensityRefNew) as follows.

$$IntensityRefNew = \frac{(MaxTest - MinTest)}{(MaxRef - MinRef)}(IntensityRef - MeanRef) + MeanTest$$

The resulting new reference image will have less process variation.

In an instance, a CDF of the histograms for the test image and the reference image are calculated. Since CDFs have a single unique percentage value for each possible gray level intensity value (I), the two CDFs can be matched point-to-point by computing the intensity transformation function $f(I)$ that enforces CDF equality across all possible image intensities in accordance with the following formula.

$$CDFTest(Intensity) = CDFRef(Intensity + f(Intensity))$$

Using the intensity transformation function, $f(I)$, the reference image can be transformed as follows.

$$IntensitRefNew = IntensityRef + f(IntensityRef)$$

The resulting new reference image may have less process variation. Other histogram scaling techniques are possible.

Turning back to FIG. 1, the parameters from the histogram scaling formula above are applied 105 to every gray level in the test image and/or every gray level in the reference image.

After the parameters are applied to the test image and the reference image, the reference image and the test image are compared 106 to produce a difference image. The comparison may include subtracting the reference image from the test image. Thus, the difference image can be configured to be generated by subtracting the reference image from the test image. The resulting difference image has less noise than a comparison before histogram scaling.

A defect can be identified on the difference image that is produced. For example, a user or an algorithm can identify a defect in the difference image.

Figure 3:
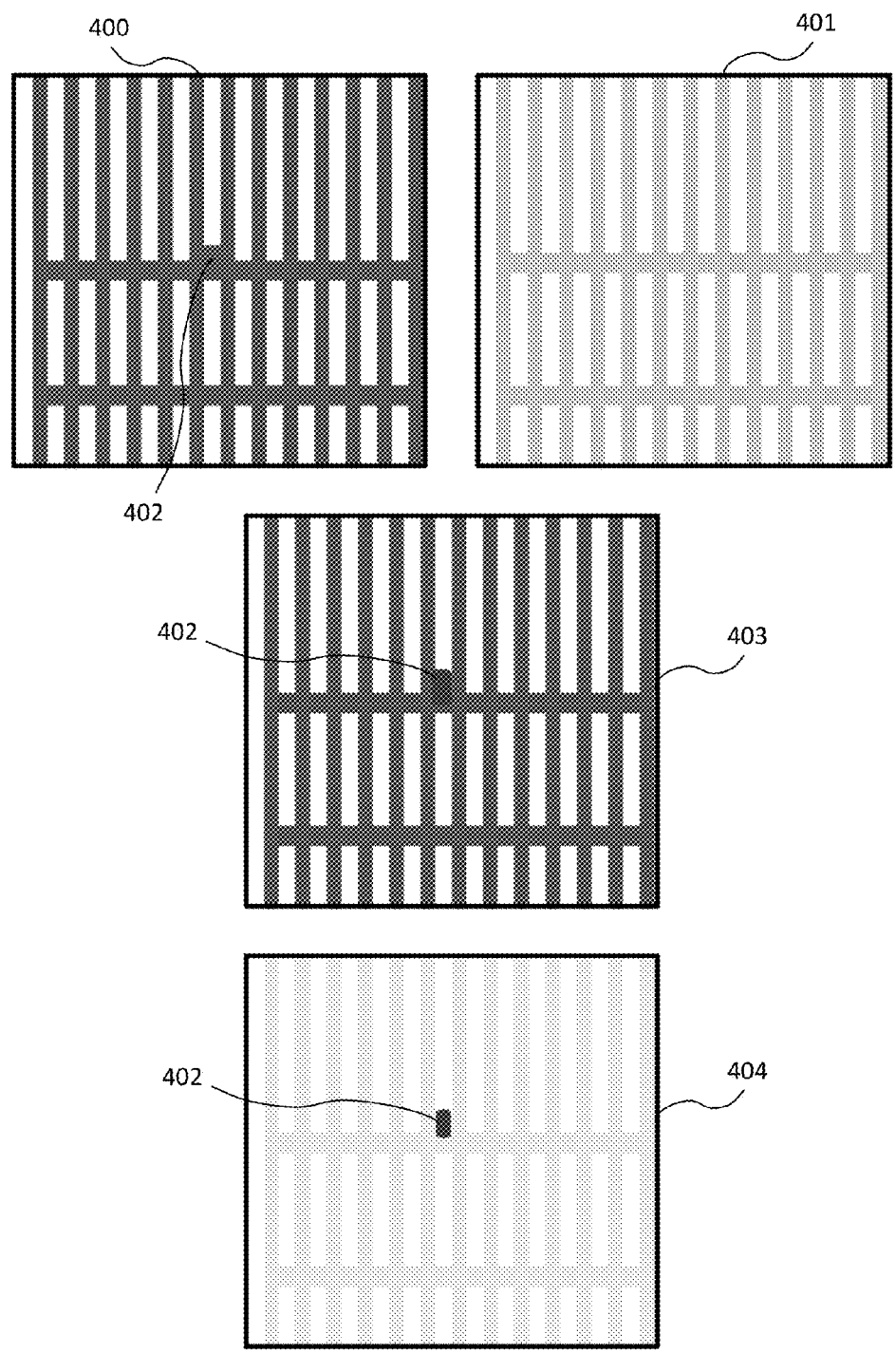
FIG. 3 represents an example using the method of FIG. 1.

FIG. 3 represents an example of using the method of FIG. 1. Image 400 is the test image and image 401 is the reference image. As seen in FIG. 3, image 400 and image 401 correspond to the same region of the wafer. Image 400 includes a defect 402.

Subtracting the image 401 from the image 400 results in the difference image 403. There is a low signal to noise value in the difference image 403. The defect 402 is buried in pattern noise caused by color in the difference image 403. This makes it difficult to identify the defect 402.

Comparing the reference image 401 and the test image 400 produces the difference image 404. The comparing can occur after the parameters from histogram scaling, such as those described in the embodiment of FIG. 1, are applied to the test image 400 and the reference image 401. The signal for the defect 402 is enhanced in difference image 404 due to color noise reduction. The difference image 404 has a higher signal to noise value than difference image 403.

Applying color attributes as a nuisance event filter also can be performed. For example, if nuisance events are a result of a process variation, then the nuisance events can be identified and filtered out.

Figure 4:
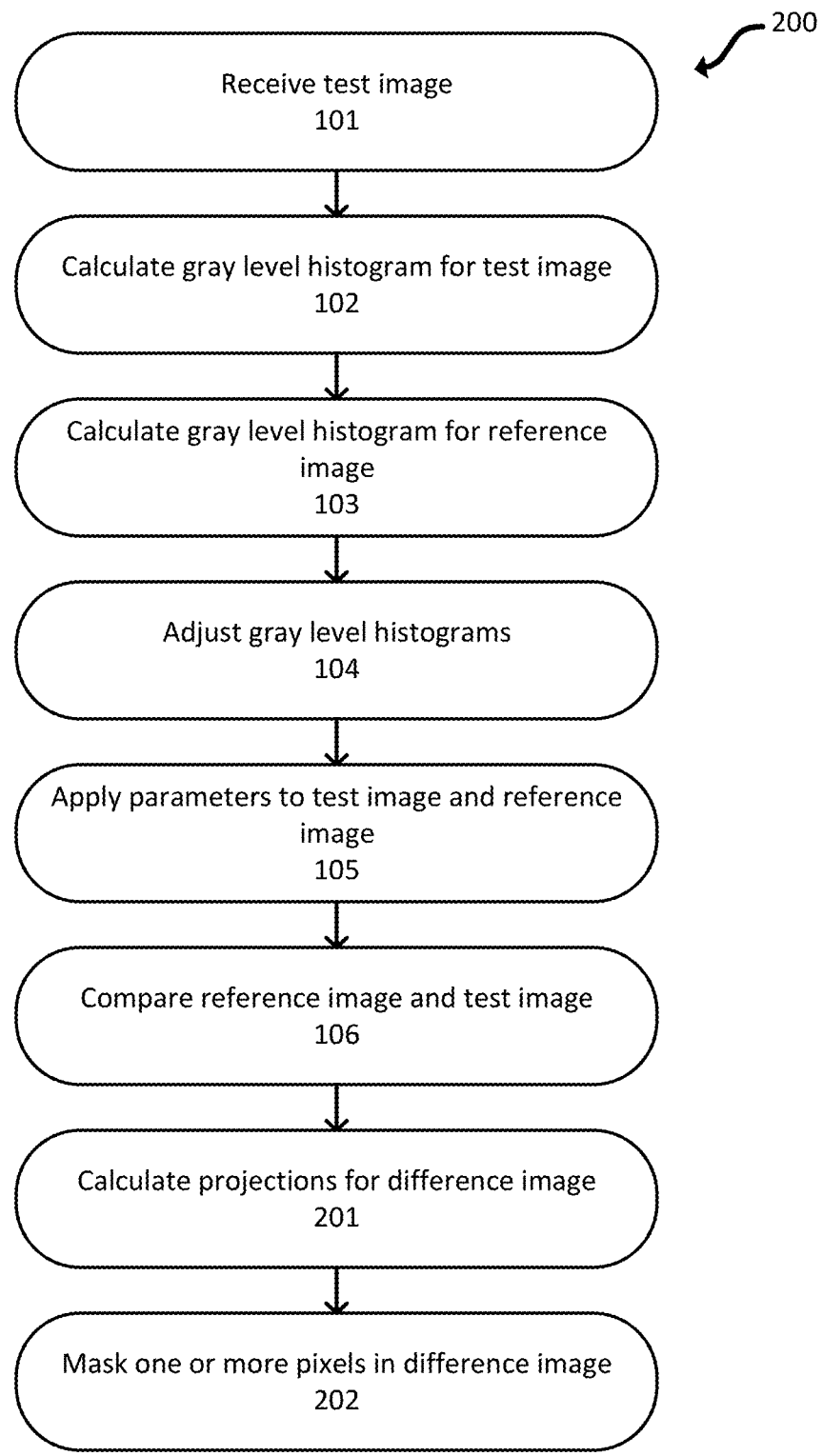
FIG. 4 is a flowchart of another embodiment of a method in accordance with the present disclosure.

FIG. 4 is a flowchart of an embodiment of another method 200. After the reference image and the test image are compared 106, projections are calculated 201 for the difference image. This can include calculating projections for the difference image perpendicular to the x axis for a first length and calculating projections for the difference image perpendicular to the y axis for a second length. One or more pixels in the difference image that exceed an x projection threshold or a y projection threshold can be masked 202. This helps remove noise from the difference image.

Figure 5:
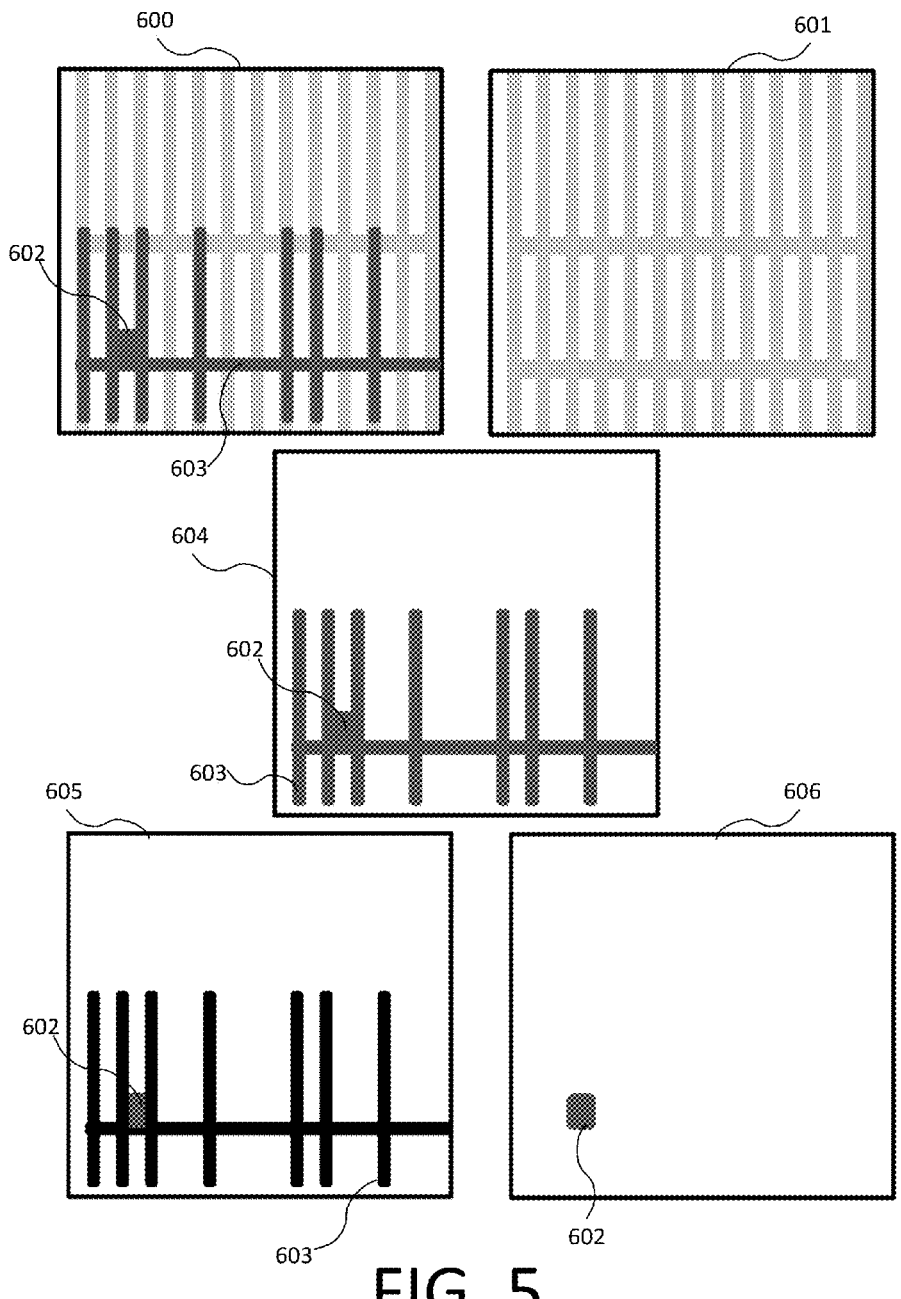
FIG. 5 represents an example using the method of FIG. 4.

FIG. 5 represents an example of using the method of FIG. 4. Image 600 is the test image and image 601 is the reference image. As seen in FIG. 5, image 600 and image 601 correspond to the same region of the wafer. Image 600 includes a defect 602 and pattern noise 603.

Subtracting the image 601 from the image 600 results in the difference image 604. Difference image 604 includes both the defect 602 and pattern noise 603. The pattern noise 603 may be present in the difference image 604 even after histogram scaling as disclosed with respect to FIG. 1 or FIG. 3.

Turning back to FIG. 5, projections for the difference image D(x,y) perpendicular to the x axis for a first length ($L_y$) and projections for the difference image D(x,y) perpendicular to the y axis for a second length ($L_x$) are calculated. This can be performed using the following two equations.

$$P(x) = \frac{1}{L_y} \sum_y^{L_y} ABS[D(x, y)]$$

$$P(y) = \frac{1}{L_x} \sum_x^{L_x} ABS[D(x, y)]$$

ABS is the absolute value. P(x) and P(y) are the projections measured along a line perpendicular to the x and the y axis, respectively.

Pixels that exceed the x or y projection thresholds will be placed in a separate segment that can be detuned with a higher threshold. For example, one or more pixels in the difference image that exceed an x projection threshold or a y projection threshold can be masked. The thresholds can be set based on population statistics computed from the image or based on an analysis of projection values saved as defect attributes during recipe optimization. An algorithm can find noisy structures which are elongated along y or x. If the noise exceeds a certain threshold, the structures are filtered out or masked up (e.g., the structures are not inspected).

Difference image 605 separates the pattern noise 603 from the DOI (e.g., defect 602).

Difference image 606 shows the defect 602 after the noisy structures are removed by masking pixels that exceed the x or y projection thresholds.

Figure 6:
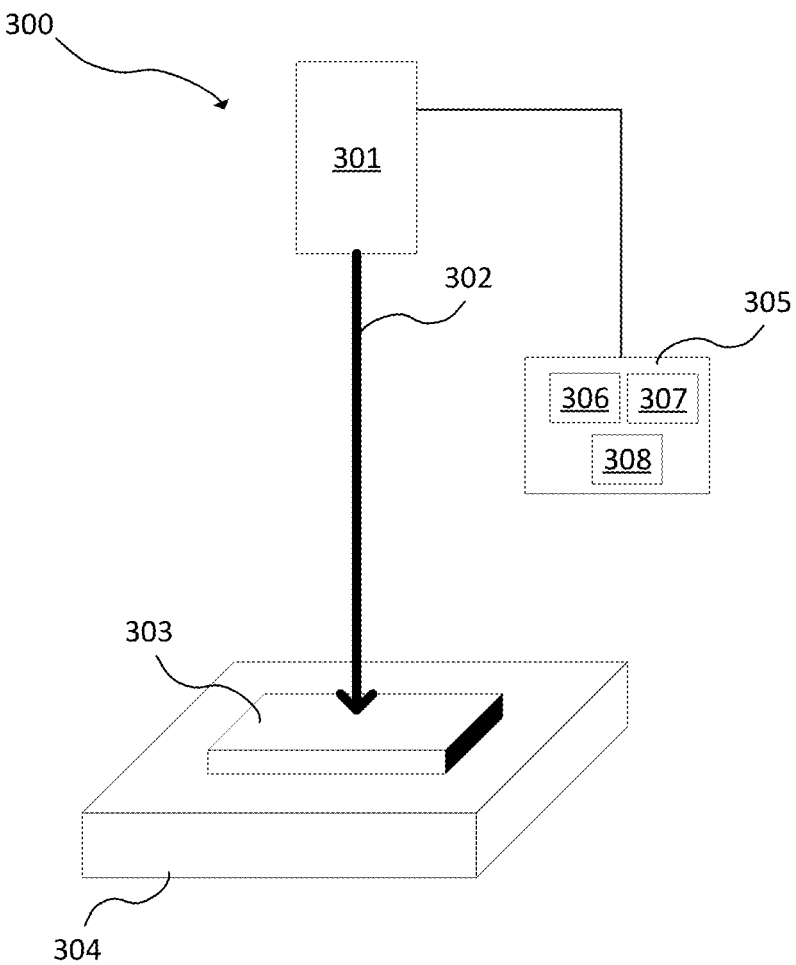
FIG. 6 is a block diagram of an embodiment of a defect review system in accordance with the present disclosure.

FIG. 6 is a block diagram of an embodiment of a defect review system 300. The defect review system 300 includes a stage 304 configured to hold a wafer 303 or other workpieces. The stage 304 may be configured to move or rotate in one, two, or three axes.

The defect review system 300 also includes an image generation system 301 configured to generate an image of a surface of the wafer 303. The image may be for a particular layer or region of the wafer 303. In this example, the image generation system 301 produces an electron beam 302 to generate a test image 303. Other image generation systems 301 are possible, such as those that use broad band plasma or laser scanning. For example, dark field imaging or bright field imaging can be performed by the image generation system 301. The defect review system 300 and/or image generation system 301 can generate a test image of the wafer 303.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

In a particular example, the defect review system 300 is part of or is a scanning electron microscope (SEM). Images of the wafer 303 are generated by scanning the wafer 303 with a focused electron beam 302. The electrons are used to produce signals that contain information about the surface topography and composition of the wafer 303. The electron beam 302 can be scanned in a raster scan pattern, and the position of the electron beam 302 can be combined with the detected signal to produce an image.

The defect review system 300 communicates with a controller 305. For example, the controller 305 can communicate with the image generation system 301 or other components of the defect review system 300. The controller 305 can include a processor 306, an electronic data storage unit 307 in electronic communication with the processor 306, and a communication port 308 in electronic communication with the processor 306. It is to be appreciated that the controller 305 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 305 to implement the various methods and functions described herein may be stored in controller readable storage media, such as a memory in the electronic data storage unit 307, within the controller 305, external to the controller 305, or combinations thereof.

The controller 305 may be coupled to the components of the defect review system 300 in any suitable manner (e.g., via one or more transmission media, which may include "wired" and/or "wireless" transmission media) such that the controller 305 can receive the output generated by the defect review system 300, such as output from the imaging device 301. The controller 305 may be configured to perform a number of functions using the output. For instance, the controller 305 may be configured to review defects on the wafer 303 using the output. In another example, the controller 305 may be configured to send the output to an electronic data storage unit 307 or another storage medium without performing defect review on the output. The controller 305 may be further configured as described herein, such as to perform the embodiments of FIG. 1 or FIG. 4.

The controller 305, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 6, electronic data storage unit 307 or other storage medium may contain non-transitory computer-readable medium that includes program instructions executable on the controller 305. The computer-implemented method may include any step(s) of any method(s) described herein, including those of FIG. 1 or FIG. 4.

Program instructions implementing methods such as those described herein may be stored on computer-readable medium, such as in the electronic data storage unit 307 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), or other technologies or methodologies, as desired.

Controller 305 may be configured according to any of the embodiments described herein. For example, the controller 305 may be programmed to perform some or all of the steps of FIG. 1 or FIG. 4.

While disclosed as part of a defect review system, the controller 305 described herein may be configured for use with inspection systems. In another embodiment, the controller 305 described herein may be configured for use with a metrology system. Thus, the embodiments of as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a stage configured to hold a wafer;
an image generation system configured to generate a test image, wherein the test image is an image of a portion of the wafer;
an electronic data storage unit in which at least one reference image is stored; and
a controller in electronic communication with the image generation system and the electronic data storage unit, wherein the controller is configured to:
receive the test image from the image generation system and the reference image from the electronic data storage unit;
calculate a gray level histogram for the test image;
calculate a gray level histogram for the reference image;
adjust the gray level histogram of the test image and the gray level histogram of the reference image by histogram scaling, wherein the histogram scaling of each of the test image and the reference image is configured to subtract a mean gray level intensity of a first image from a gray level intensity of the first image thereby calculating a difference, to multiply the difference by a gain factor based on maximum and minimum gray level intensity values of the first image and a second image thereby calculating a multiplication result, and to add a constant intensity offset to the multiplication result, wherein the constant intensity offset is based the second image, wherein the first image is one of the test image and the reference image and the second image is the other of the test image and the reference image;

compare the reference image and the test image to produce a difference image after adjusting the gray level histograms of the test image and the reference image by the histogram scaling; and identify a defect on the difference image with an algorithm.

2. The system of claim 1, wherein the controller includes a processor and a communication port in electronic communication with the processor and the electronic data storage unit.

3. The system of claim 1, wherein the image generation system is part of a scanning electron microscope.

4. The system of claim 1, wherein the image generation system is configured to use at least one of an electron beam, a broad band plasma, or a laser to generate the test image.

5. The system of claim 1, wherein the image generation system is configured to use one of bright field or dark field illumination.

6. The system of claim 1, wherein the gain factor is a ratio of a difference between maximum and minimum gray level intensity values of one of the first image or the second image and maximum and minimum gray level intensity values of the other of the first image or the second image, and wherein the constant intensity offset is a mean gray level intensity.

7. The system of claim 1, wherein the difference image is configured to be generated by subtracting the reference image from the test image.

8. The system of claim 1, wherein the test image and the reference image correspond to a same region of the wafer.

9. The system of claim 1, wherein the controller is further configured to:

calculate projections for the difference image perpendicular to an x axis for a first length;

calculate projections for the difference image perpendicular to a y axis for a second length; and mask one or more pixels in the difference image along the first length that exceed an x projection threshold or along the second length that exceed a y projection threshold.

10. A method comprising:

receiving a test image from a system, wherein the test image is an image of a portion of a wafer;

calculating, using a controller, a gray level histogram for the test image;

calculating, using the controller, a gray level histogram for a reference image;

adjusting, using the controller, the gray level histogram of the test image and the gray level histogram of the reference image by histogram scaling, wherein the histogram scaling of each of the test image and the reference image is configured to subtract a mean gray level intensity of a first image from a gray level intensity of the first image thereby calculating a difference, to multiply the difference by a gain factor based on maximum and minimum gray level intensity values of the first image and a second image thereby calculating a multiplication result, and to add a constant intensity offset to the multiplication result, wherein the constant intensity offset is based the second image, wherein the first image is one of the test image and the reference image and the second image is the other of the test image and the reference image;

comparing, using the controller, the reference image and the test image to produce a difference image after adjusting the gray level histograms of the test image and the reference image by the histogram scaling; and identifying, using the controller, a defect on the difference image with an algorithm.

11. The method of claim 10, wherein the gain factor is a ratio of a difference between maximum and minimum gray level intensity values of one of the first image or the second image and maximum and minimum gray level intensity values of the other of the first image or the second image, and wherein the constant intensity offset is a mean gray level intensity.

12. The method of claim 10, wherein the test image is a microscope image.

13. The method of claim 10, wherein the comparing includes subtracting the reference image from the test image.

14. The method of claim 10, wherein the test image and the reference image correspond to a same region of the wafer.

15. The method of claim 10, further comprising:

calculating projections for the difference image perpendicular to an x axis for a first length;

calculating projections for the difference image perpendicular to a y axis for a second length; and masking one or more pixels in the difference image along the first length that exceed an x projection threshold or along the second length that exceed a y projection threshold.

* * * * *